(12) United States Patent
Cherolis et al.

(10) Patent No.: US 10,309,308 B2
(45) Date of Patent: Jun. 4, 2019

(54) COOLING PASSAGES FOR A MID-TURBINE FRAME

(71) Applicant: United Technologies Corporation, Hartford, CT (US)

(72) Inventors: Anthony P. Cherolis, Hartford, CT (US); Jeffrey J. Lienau, Wethersfield, CT (US); Robert Newman, Harwinto, CT (US); Cheng-Zhang Wang, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 680 days.

(21) Appl. No.: 14/598,732

(22) Filed: Jan. 16, 2015

(65) Prior Publication Data

US 2016/0208701 A1 Jul. 21, 2016

(51) Int. Cl.
*F02C 7/18* (2006.01)
*F01D 9/06* (2006.01)

(52) U.S. Cl.
CPC ............... *F02C 7/18* (2013.01); *F01D 9/065* (2013.01); *F05D 2220/3213* (2013.01); *F05D 2240/90* (2013.01); *Y02T 50/675* (2013.01)

(58) Field of Classification Search
None
See application file for complete search history.

(56) References Cited

U.S. PATENT DOCUMENTS

| | | | | |
|---|---|---|---|---|
| 2,620,157 A * | 12/1952 | Morley | ................. | F01D 25/162 384/277 |
| 4,979,872 A * | 12/1990 | Myers | ..................... | F01D 9/065 403/131 |
| 5,160,251 A * | 11/1992 | Ciokajlo | ............... | F01D 25/162 415/142 |
| 5,634,767 A * | 6/1997 | Dawson | ................ | F01D 25/246 415/134 |
| 6,099,165 A * | 8/2000 | Tremaine | .............. | F01D 25/164 384/535 |
| 6,102,577 A * | 8/2000 | Tremaine | ................ | F01D 9/065 184/104.1 |
| 6,398,485 B1 * | 6/2002 | Frosini | ...................... | F01D 5/08 415/115 |
| 7,195,447 B2 | 3/2007 | Moniz et al. | | |

(Continued)

FOREIGN PATENT DOCUMENTS

| | | |
|---|---|---|
| WO | 2014051672 | 4/2014 |
| WO | 2014105522 | 7/2014 |

OTHER PUBLICATIONS

Extended European Search Report for European Application No. 16151317.7 dated May 27, 2016.

*Primary Examiner* — Jason D Shanske
*Assistant Examiner* — Jessica L Kebea
(74) *Attorney, Agent, or Firm* — Carlson, Gaskey & Olds, P.C.

(57) ABSTRACT

A gas turbine engine includes a mid-turbine frame that includes an inner frame case. At least one spoke is connected to the inner frame case. At least one spoke includes a fluid passage that is in fluid communication with a channel on a radially inner end of the fluid passage. The channel is directed in a radially inward and circumferential direction. A cavity is located radially inward from the mid-turbine frame and is in fluid communication with the channel.

13 Claims, 5 Drawing Sheets

(56) References Cited

U.S. PATENT DOCUMENTS

| | | |
|---|---|---|
| 8,061,969 B2 | 11/2011 | Durocher et al. |
| 8,091,371 B2 | 1/2012 | Durocher et al. |
| 8,100,633 B2* | 1/2012 | Propheter-Hinckley ............ F02C 7/18 415/115 |
| 8,240,974 B2* | 8/2012 | Nyamu ............ F01D 5/084 415/1 |
| 9,347,374 B2* | 5/2016 | Suciu ............ F01D 5/081 |
| 2003/0106318 A1* | 6/2003 | Leahy, Jr. ............ F01D 9/023 60/722 |
| 2004/0240987 A1* | 12/2004 | Czachor ............ F01D 25/162 415/142 |
| 2006/0093465 A1 | 5/2006 | Moniz et al. |
| 2008/0134687 A1 | 6/2008 | Kumar et al. |
| 2010/0135770 A1* | 6/2010 | Durocher ............ F01D 9/065 415/69 |
| 2010/0275572 A1* | 11/2010 | Durocher ............ F01D 9/065 60/39.08 |
| 2011/0079019 A1 | 4/2011 | Durocher et al. |
| 2011/0081237 A1 | 4/2011 | Durocher et al. |
| 2012/0011824 A1* | 1/2012 | Cigal ............ F01D 9/065 60/39.08 |
| 2013/0052006 A1* | 2/2013 | Petty ............ F01D 25/24 415/213.1 |
| 2013/0094951 A1* | 4/2013 | McCaffrey ............ F01D 25/162 415/200 |
| 2013/0192235 A1* | 8/2013 | Sanchez ............ F02C 7/12 60/772 |
| 2013/0219919 A1* | 8/2013 | Suciu ............ F01D 5/081 60/782 |
| 2014/0102110 A1 | 4/2014 | Farah et al. |

* cited by examiner

COOLING PASSAGES FOR A MID-TURBINE FRAME

BACKGROUND

The present disclosure relates generally to a gas turbine engine, and in particular to a mid-turbine frame (MTF) included in a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A mid-turbine frame (MTF) is positioned between a high pressure turbine stage and a low pressure turbine stage of a gas turbine engine. The MTF supports one or more bearings and transfers bearing loads from an inner portion of the gas turbine engine to an outer engine frame. The MTF also serves to route air from the high pressure turbine stage to the low pressure turbine stage.

SUMMARY

In one exemplary embodiment, a gas turbine engine includes a mid-turbine frame that includes an inner frame case. At least one spoke is connected to the inner frame case. At least one spoke includes a fluid passage that is in fluid communication with a channel on a radially inner end of the fluid passage. The channel is directed in a radially inward and circumferential direction. A cavity is located radially inward from the mid-turbine frame and is in fluid communication with the channel.

In a further embodiment of the above, the cavity forms a bearing support cavity and is at least partially defined by the inner frame case and a bearing support member.

In a further embodiment of any of the above, the cavity forms a torque box.

In a further embodiment of any of the above, the channel is located in a plug separate from at least one spoke and the plug contacts at least one spoke and is adjacent to the inner frame case.

In a further embodiment of any of the above, the plug includes a conical portion tapering to the channel.

In a further embodiment of any of the above, the channel is located in a base portion of at least one spoke.

In a further embodiment of any of the above, the channel is located in the inner frame case.

In a further embodiment of any of the above, the channel extends at an angle between 30 and 80 degrees relative to a base portion of at least one spoke.

In another exemplary embodiment, a mid-turbine frame in a gas turbine engine includes a hollow spoke including a fluid passage that is in fluid communication with a channel on a radially inner end of the fluid passage. The channel is directed in a radially inward and circumferential direction.

In a further embodiment of any of the above, an inner frame case is at least partially defining a cavity radially inward from the inner frame case. The channel is in fluid communication with the cavity.

In a further embodiment of any of the above, the cavity is at least partially defined by the inner frame case and a bearing support member. The cavity forms a torque box.

In a further embodiment of any of the above, the channel is located in a plug.

In a further embodiment of any of the above, the channel is located in the plug and the plug includes a conical portion tapering to the channel.

In a further embodiment of any of the above, the channel is located in a base portion of the hollow spoke.

In a further embodiment of any of the above, there is an inner frame case. The channel is located in the inner frame case.

In a further embodiment of any of the above, the channel extends at an angle between 30 and 80 degrees relative to a base portion of the hollow spoke.

In another exemplary embodiment, a method of cooling a portion of a gas turbine engine includes directing cooling airflow through a hollow spoke in a mid-turbine frame. The cooling airflow is directed into a cavity on a radially inner end of the hollow spoke. The cooling airflow is directed radially inward and circumferentially.

In a further embodiment of any of the above, the airflow is directed into the cavity through a channel that is in fluid communication with a fluid passage extending through the hollow spoke.

In a further embodiment of any of the above, the channel is located in at least one of a plug, the hollow spoke, and an inner frame case.

In a further embodiment of any of the above, the cavity forms a torque box and is at least partially defined by an inner frame case and a bearing support member.

DETAILED DESCRIPTION

Figure 1:
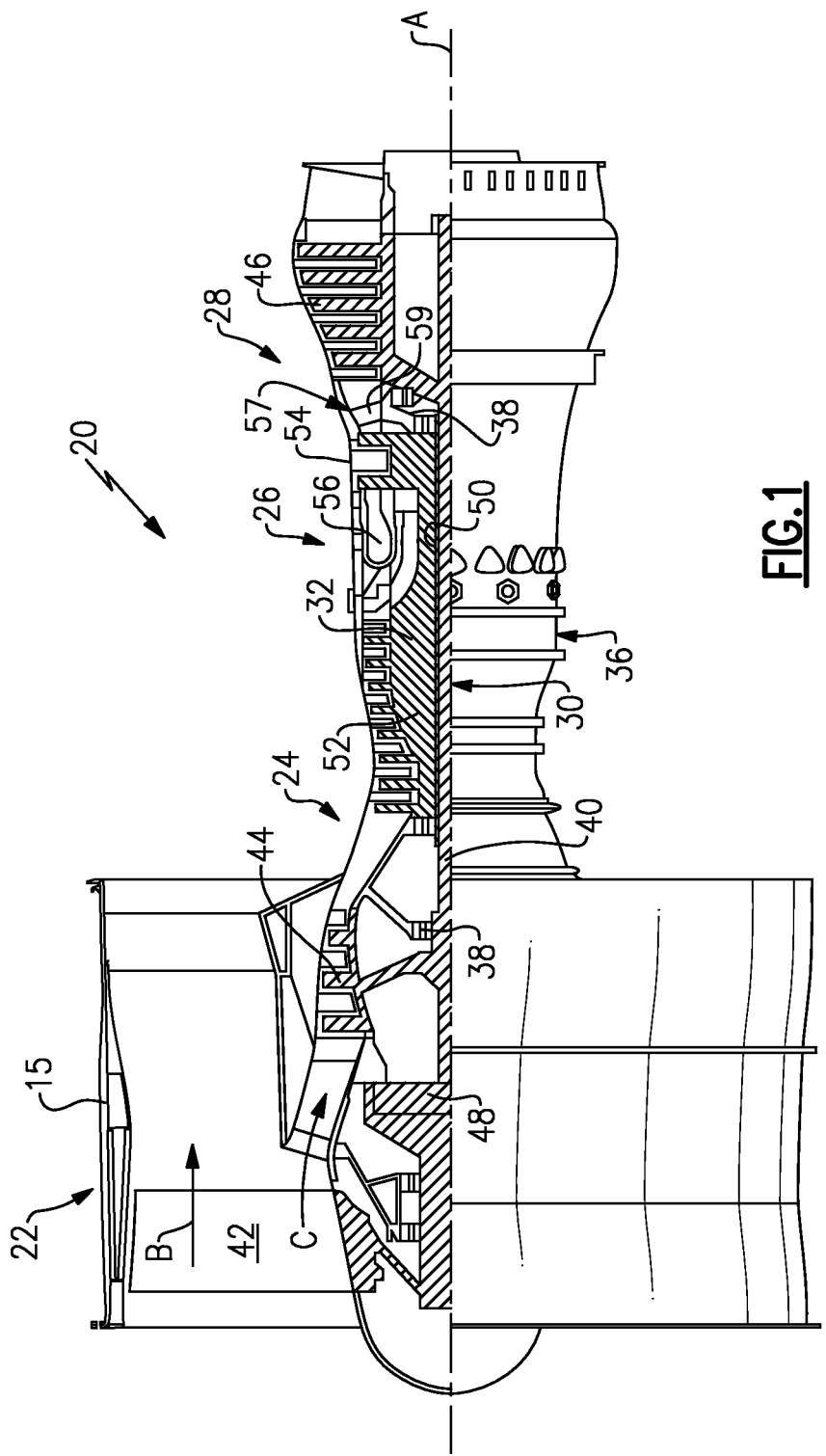
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes a turning vane stage 59 which is in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
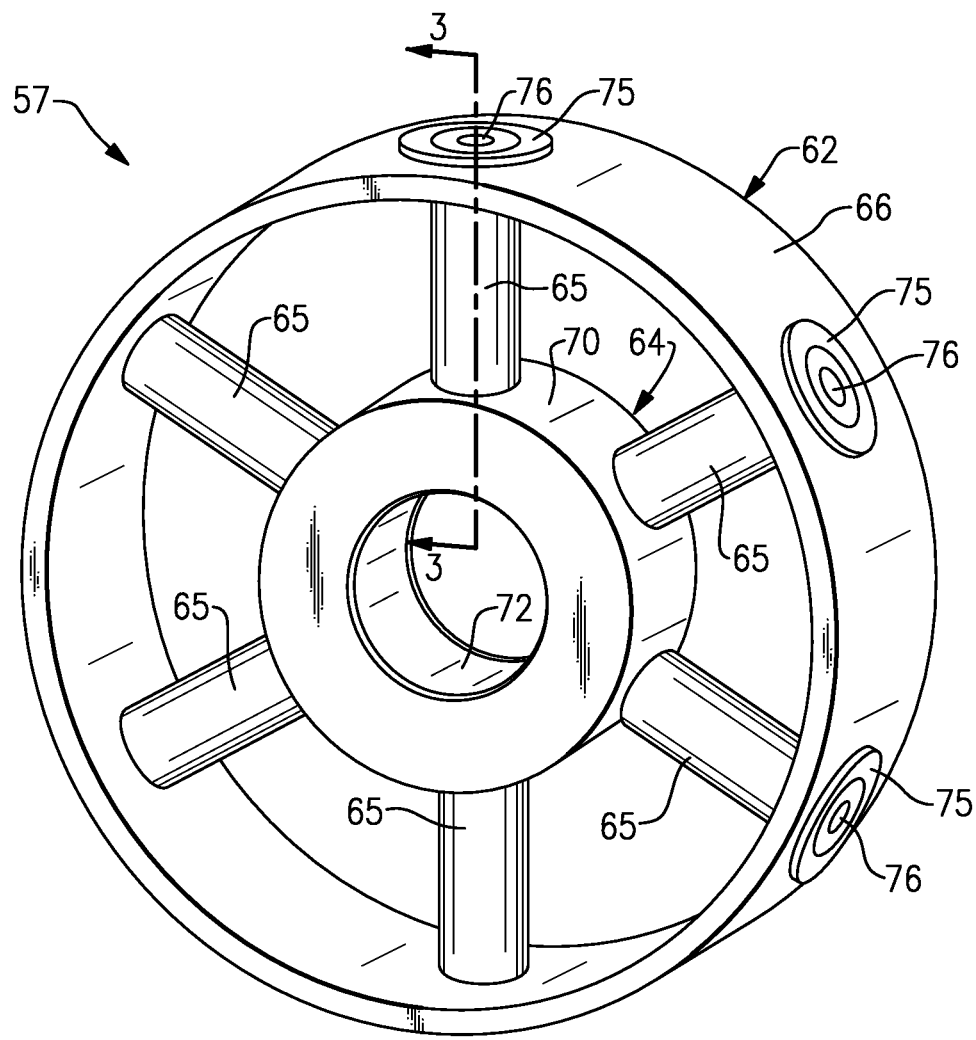
FIG. 2 is a schematic perspective view of an example mid-turbine frame in the gas turbine engine.

FIG. 2 is a schematic perspective view of one embodiment of the mid-turbine frame 57. The schematic view shown in FIG. 2 is high level conceptual view and is intended to illustrate relative positioning of various components, but not actual shape of various components. The mid-turbine frame 57 includes an outer frame case 62, an inner frame case 64, and a plurality of hollow spokes 65. The outer frame case 62 includes an outer diameter surface 66. The inner frame case 64 includes an outer diameter surface 70 and an inner diameter surface 72. In the embodiment shown in FIG. 2, six hollow spokes 65 are distributed around the circumference of the inner frame case 64 to provide structural support between the inner frame case 64 and the outer frame case 62. In alternative embodiments, the mid-turbine frame 57 can have more or less than 6 hollow spokes.

The inner frame case 64 supports the rotor assembly via the bearing systems 38 (shown in FIG. 1), and distributes the force from the inner frame case 64 to the outer frame case 62 via the plurality of hollow spokes 65. Attachment of the hollow spokes 65 to the outer frame case 62 is provided at a plurality of bosses 75 located circumferentially around the outer diameter surface 66 of the outer frame case 62.

In one embodiment, attachment of the hollow spokes 65 at the plurality of bosses 75 may be secured by a retaining nut 92 (shown in FIG. 3) that allows the hollow spokes 65 to be tensioned. The hollow spokes 65 can be tensioned via a threaded connection so as to remain in tension during substantially all operating conditions of gas turbine engine 20. Apertures 76 formed in each of the plurality of bosses 75 allow cooling airflow to be distributed into a hollow portion of each of the hollow spokes 65. In this way, the cooling airflow is directed from the outer diameter through the hollow portions of the cooled hollow spokes 65 towards the inner frame case 64. The cooling airflow can function to cool the hollow spokes 65 and also to cool components radially inward of the inner frame case 64, such as the bearings systems 38. The cooling airflow is then directed to the low-rotor cavity 126 to cool the turbine rotors.

Figure 3:
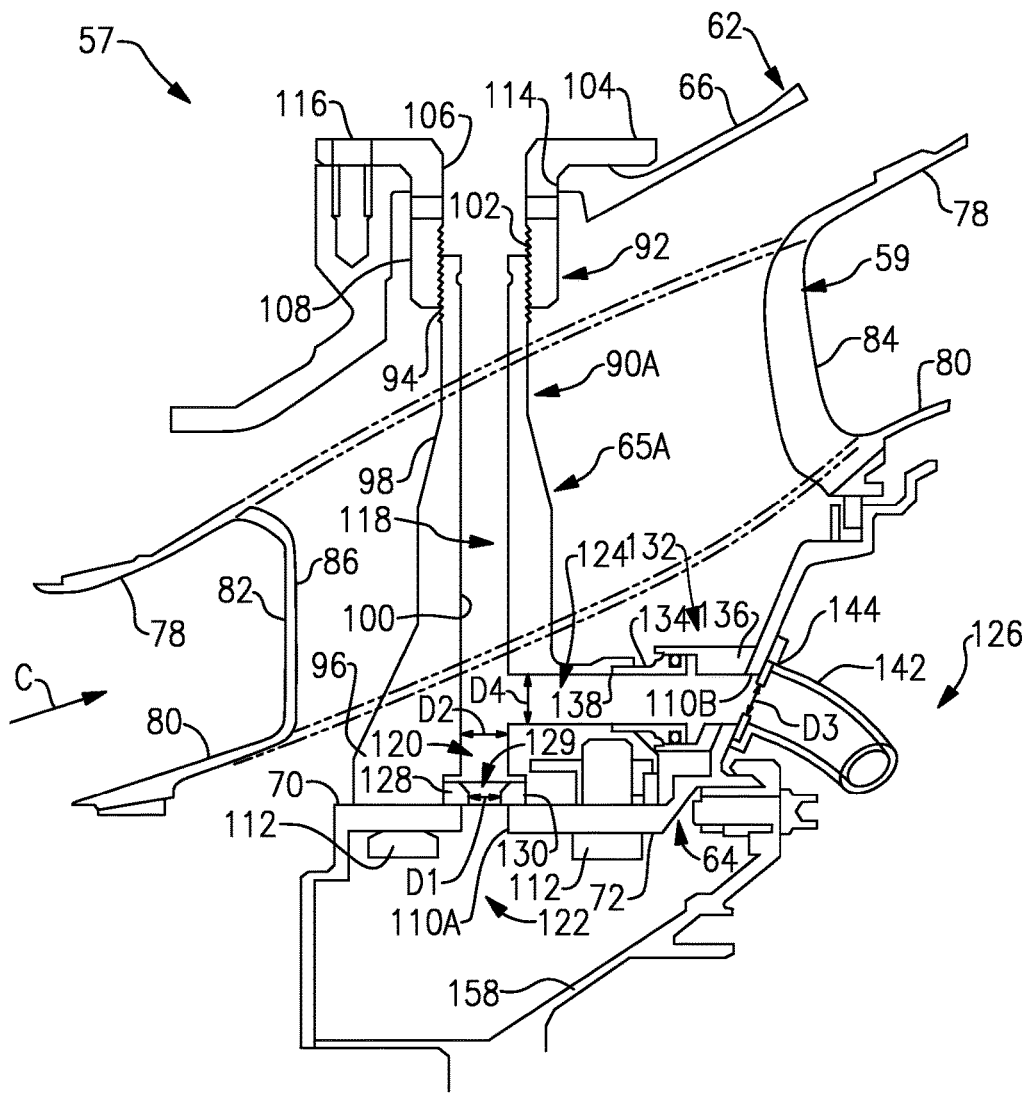
FIG. 3 is a sectional view taken along line 3-3 of FIG. 2.

FIG. 3 is a cross-sectional view of the mid-turbine frame 57 taken along line 3-3 of FIG. 2. A hollow spoke 65A is one example of the hollow spokes 65 shown in FIG. 2. The hollow spoke 65A extends from the outer frame case 62 through the turning vane 59 to the inner frame case 64. The turning vane 59 extends from an outer platform 78 to an inner platform 80. In the illustrated embodiment, the turning vane 59, the outer platform 78, and the inner platform 80 are integrally formed, and are all positioned radially inward of the outer frame case 62 and radially outward of the inner frame case 64. The turning vane 59, the outer platform 78, and the inner platform 80 define a portion of the core flow path C at the mid-turbine frame 57. The turning vane 59 extends axially from a leading edge 82 to a trailing edge 84. The turning vane 59 is oblong so as to be longer in the axial direction than in the circumferential direction. The turning vane 59 has a hollow interior 86, which is also relatively narrow in the circumferential direction.

In the illustrated embodiment, the hollow spoke 65A includes a tie rod 90A and a retaining nut 92. The tie rod 90A is an elongated hollow tube that includes a threaded surface 94 at a radially outer end and a flange 96 at a radially inner end. The threaded surface 94 is on an outer surface 98 of the tie rod 90A. An inner passage surface 100 of the tie rod 90A defines an inlet passage 118 through the tie rod 90A. The tie rod 90A tapers along its length from the flange 96 at its radially inner end to the threaded surface 94 at its radially outer end.

The retaining nut 92 includes a threaded surface 102 at a radially inner end of the retaining nut 92 and a flange 104 at a radially outer end of the retaining nut 92. The threaded surface 102 is on an inner surface 106 of the retaining nut 92. The flange 104 extends outward from an outer surface 108 of the retaining nut 92.

In the illustrated embodiment, the flange 96 of the tie rod 90A abuts against the inner frame case 64 so that the inner passage surface 100 aligns with a hole 110A in the inner frame case 64. The flange 96 is attached to the inner frame case 64 via bolts 112. The retaining nut 92 extends through a hole 114 in the outer frame case 62 such that the flange 104 abuts against the outer diameter surface 66 of the outer frame case 62. The flange 104 is attached to the outer frame case 62 via a bolt 116. The bolt 116 extends through the flange 104 into the outer frame case 62. The tie rod 90A is threaded into the retaining nut 92 to attach the tie rod 90A to the retaining nut 92. In the illustrated embodiment, a portion but not all of the threaded surface 94 overlaps with a portion but not all of the threaded surface 102.

During assembly, the tie rod 90A is inserted through the hollow interior 86 of the turning vane 59 in a direction from radially inward to radially outward. The inner frame case 64 is then positioned radially inward of the tie rod 90A and attached to the tie rod 90A by the bolts 112. The retaining nut 92 is then inserted through the hole 114 and threadedly engaged with the tie rod 90A. The retaining nut 92 can be tightened, as desired, in a manner described below. Once the retaining nut 92 is suitably tightened on the tie rod 90A, the bolt 116 is inserted to fix the retaining nut 92 to the outer frame case 62 to prevent the retaining nut 92 from rotating and loosening.

Because the threaded surface 94 overlaps with the threaded surface 102 only partially, the threaded connection between the retaining nut 92 and the tie rod 90A is variable. The retaining nut 92 does not bottom out at any particular point when threaded on the tie rod 90A. This allows the retaining nut 92 to be threaded on the tie rod 90A to an extent determined during assembly, not predetermined prior to assembly. This allows the hollow spoke 65A, and the mid-turbine frame 57 in general, to be relatively insensitive to manufacturing tolerances.

The inlet passage 118 branches off between a first branch 120 extending into a bearing support cavity 122 and a second branch 124 extending into a low-rotor cavity 126. The first branch 120 extends in a radially inward direction through the inner frame case 64.

A plug 128 is aligned with the first branch 120 and is located in an opening 130 in the hollow spoke 65A adjacent the outer diameter surface 70 of the inner frame case 64. The plug 128 includes an opening 129 having a conical radially outer portion 131 that tapers to a cylindrical channel 133 on a radially inner side. Alternatively the plug 128 may have a simple non-conical outer portion. The cylindrical channel 133 includes a diameter D1 that is smaller than a diameter D2 defined by the inner passage surface 100. In the illustrated example, the cylindrical channel 133 includes a diameter D1, however, the diameter D1 could be any dimension that is smaller than the dimension D2 in order to control the amount of cooling airflow that travels into the bearing support cavity 122.

The second branch 124 extends in an axially downstream direction perpendicular to the first branch 120. Although the second branch 124 is shown being perpendicular to the first branch 120, the second branch 124 could be within 30 degrees of being perpendicular to the first branch 120. The second branch 124 is in fluid communication with the low rotor cavity through a fitting 132 that extends to an angled portion of the inner frame case 64 and connects to a swirler tube 142. Alternatively, the swirler tube 142 could be removed and the cooling airflow would directly enter the low-rotor cavity 126.

Figure 4:
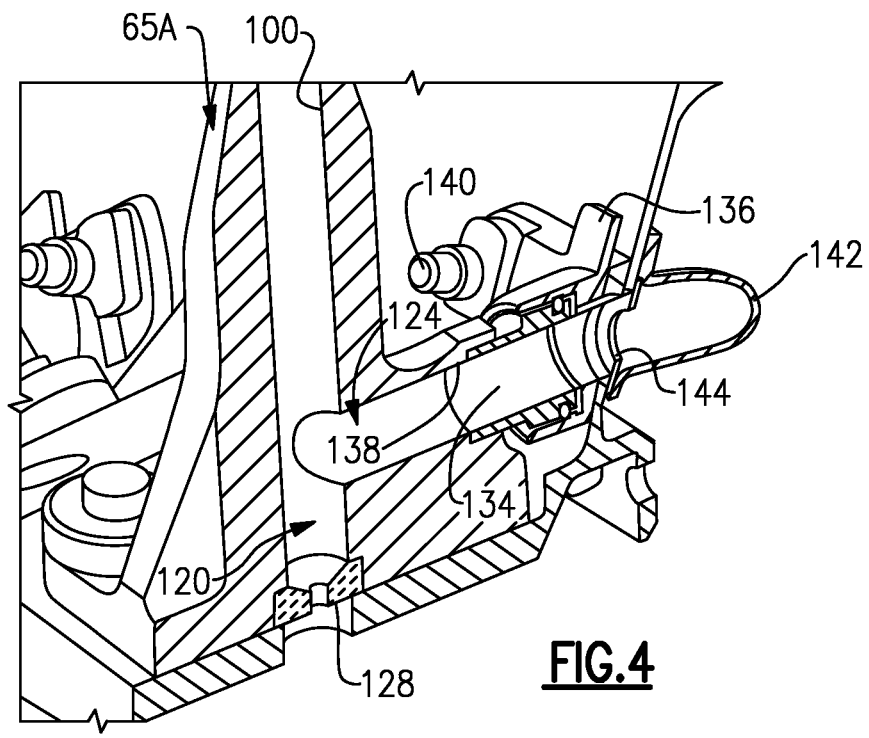
FIG. 4 is a sectional view of an example hollow spoke.

The fitting 132 includes a transfer tube 134 pressed into an opening 138 in the hollow spoke 65A on a first end and engages a cup boss 136 on a second end. An O-ring creates a seal between an outer diameter of the transfer tube 134 and the cup boss 136. As shown in FIGS. 4, the cup boss 136 is fastened to the inner frame case 64 with fasteners 140 and is aligned with a hole 110B in the inner frame case 64. The fasteners 140 also secure the swirler tube 142 to an opposite side of the inner frame case 64 from the cup boss 136. The swirler tube 142 directs the cooling airflow into the low rotor cavity in the direction of rotation of the low rotor to reduce turning and aerodynamic losses in the cooling airflow.

A restricting ring 144 is located between the swirler tube 142 and the inner diameter surface 72. The restricting ring 144 includes a diameter D3 which is smaller than a diameter D4 of the second branch 124. The restricting ring 144 restricts the amount of cooling airflow through the second branch 124 to aid in dividing the amount of cooling airflow traveling into the bearing support cavity 122 and the low-rotor cavity 126. Although the restricting ring 144 is shown between the swirler tube 142 and the inner frame case 64, the restricting ring 144 could be located anywhere within the second branch 124 to reduce the cooling airflow into the low-rotor cavity 126. In one example, the a first portion of cooling airflow travels into the bearing support cavity 122 and a second portion of cooling airflow travels into the low-rotor cavity 126, with the second portion being greater than the first portion.

Figure 5:
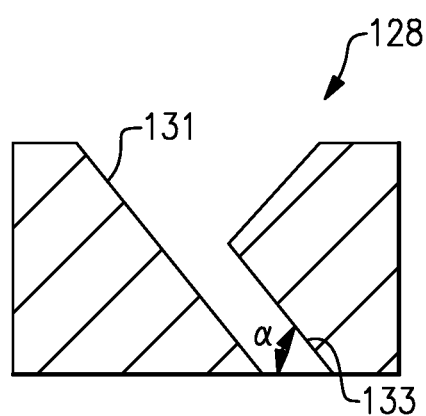
FIG. 5 is a sectional view of a plug.
Figure 6:
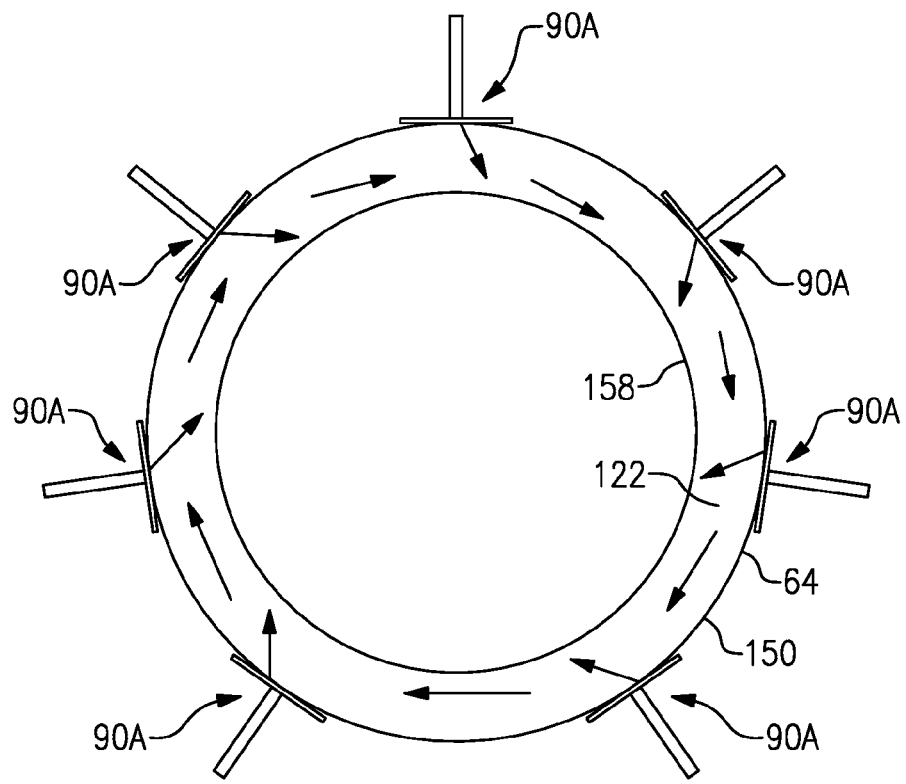
FIG. 6 is a schematic view of cooling airflow traveling through a cavity.

As shown in FIG. 5, the cylindrical channel 133 of the plug 128 extends in a radially inward direction with a component in a circumferential direction. In the subject disclosure, the circumferential direction is relative to a centerline along the engine axis A. In the illustrated example, the cylindrical channel 133 extends through a plane that is perpendicular to the engine axis A to reduce cooling airflow from traveling axially forward or aft. In another example, the cylindrical channel 133 includes a component extending axially forward or aft. The cylindrical channel 133 extends at an angle α relative to a base portion of the plug 128 and a base portion of the tie rod 90A. By angling the cylindrical channel 133 at the angle α, the cooling airflow is able to create a circumferential flow in the bearing support cavity 122 as shown in FIG. 6.

In one example, the angle α is between 30 and 80 degrees. The angle α of the cylindrical channel 133 creates a circumferential flow in a clockwise direction in the bearing support cavity 122, which defines a torque box 150, as shown in FIGS. 5 and 6. The torque box 150 includes the inner frame case 64 and a bearing support member 158. The plug 128 could be rotated 180 degrees so that cooling airflow exiting the cylindrical channel 133 creates a circumferential flow in a counterclockwise direction.

Figure 7:
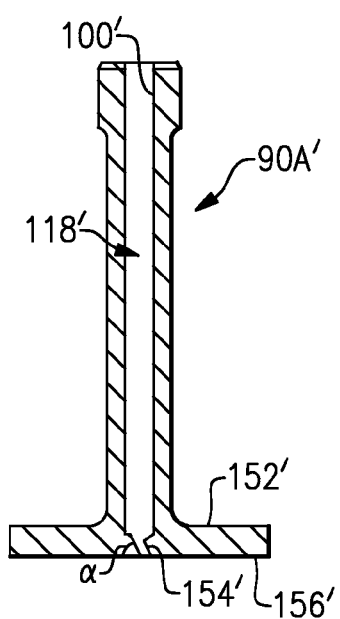
FIG. 7 is a sectional view of an example tie rod.

FIG. 7 illustrates a sectional view of another example tie rod 90A'. The tie rod 90A' is similar to the tie rod 90A except where described below or shown in the Figures. The tie rod 90A' includes a channel 154' into a base portion 152' of the tie rod 90A' which replaces the plug 128. An inner passage surface 100' defines an inlet passage 118' that extends to the base portion 152' of the tie rod 90A' The channel 154' is located at a radially inner end of the inlet passage 118' and extends through the base portion 152' of the tie rod 90A' at an angle α relative to a base surface 156'. By angling the channel 154' at the angle α, the cooling airflow is able to create a circumferential flow in the bearing support cavity 122 as shown in FIG. 6.

Figure 8:
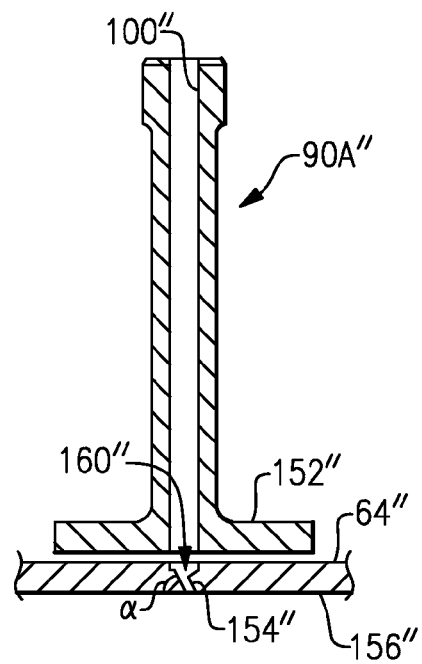
FIG. 8 is a sectional view of another example tie rod and an example inner frame case.

FIG. 8 illustrates sectional view of yet another example tie rod 90A". The tie rod 90A" is similar to the tie rod 90A except where described below or shown in the Figures. The tie rod 90A" includes an inner passage surface 100" that extends entirely through a base portion 152" of the tie rod 90A" and is aligned with an inlet 160" in the inner frame case 64'. The inlet 160" in the inner frame case 64' includes a channel 154" that extends at an angle α relative to a base surface 156" of the base portion 152" to create the circumferential flow as shown in FIG. 6. By angling the channel 154" at the angle α, the cooling airflow is able to create a circumferential flow in the bearing support cavity 122 as shown in FIG. 6.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gas turbine engine comprising:
a mid-turbine frame including:
an inner frame case; and
at least one spoke connected to the inner frame case, wherein the at least one spoke includes a fluid passage in fluid communication with a channel on a radially inner end of the fluid passage, the channel located in a plug separate from the at least one spoke, the plug contacting the at least one spoke and adjacent to the inner frame case, the plug including a conical portion tapering to the channel; and
a cavity located radially inward from the mid-turbine frame in fluid communication with the channel; and
wherein an outlet of the channel directs a fluid into the cavity circumferentially relative to a longitudinal axis of a gas turbine shaft.

2. The gas turbine engine of claim 1, wherein the cavity forms a bearing support cavity and is at least partially defined by the inner frame case and a bearing support member.

3. The gas turbine engine of claim 2, wherein the cavity forms a torque box.

4. The gas turbine engine of claim 1, where the channel extends in a circumferential direction at an angle between 30 and 80 degrees relative to a base portion of the at least one spoke.

5. A mid-turbine frame in a gas turbine engine comprising:
a hollow spoke including a fluid passage in fluid communication with a channel on a radially inner end of the fluid passage, wherein the channel is located in a plug separate from the hollow spoke, the plug contacting the hollow spoke, adjacent to an inner frame case, and located radially outward from the inner frame case relative to a longitudinal axis of the gas turbine engine; and
the inner frame case at least partially defining a cavity radially inward from the inner frame case, wherein the channel is in fluid communication with the cavity and the hollow spoke is directly connected to the inner frame case and the channel includes a cylindrical cross section located in the plug and the plug includes a conical portion tapering to the channel.

6. The mid-turbine frame of claim 5, wherein the cavity is at least partially defined by the inner frame case and a bearing support member and the cavity forms a torque box.

7. The mid-turbine frame of claim 5, wherein the channel extends in a circumferential direction relative to an a longitudinal axis of the gas turbine engine at an angle between 30 and 80 degrees relative to a base portion of the hollow spoke.

8. The mid-turbine frame of claim 5, wherein an outlet of the channel directs a fluid into the cavity circumferentially relative to a longitudinal axis of the gas turbine engine.

9. The mid-turbine frame of claim 5, wherein a radially inner most surface of the plug contacts a radially outer surface of the inner frame case.

10. The mid-turbine frame of claim 5, wherein a plurality of fasteners extend through the inner frame case into the hollow spoke.

11. A method of cooling a portion of a gas turbine engine comprising:
directing cooling airflow through a hollow spoke in a mid-turbine frame, the hollow spoke including a fluid passage in fluid communication with a channel on a radially inner end of the fluid passage, the channel located in a plug separate from the hollow spoke, the plug contacting the hollow spoke and adjacent to an inner frame case, the plug including a conical portion tapering to the channel; and directing the cooling airflow into a cavity on a radially inner end of the hollow spoke, wherein an outlet of the channel directs the cooling airflow into the cavity circumferentially relative to a longitudinal axis of the gas turbine engine.

12. The method of claim 11, wherein the channel extends in a circumferential direction at an angle between 30 and 80 degrees relative to a base portion of the hollow spoke.

13. The method of claim 11, wherein the cavity forms a torque box and is at least partially defined by the inner frame case and a bearing support member.

* * * * *